Patented Jan. 2, 1923.

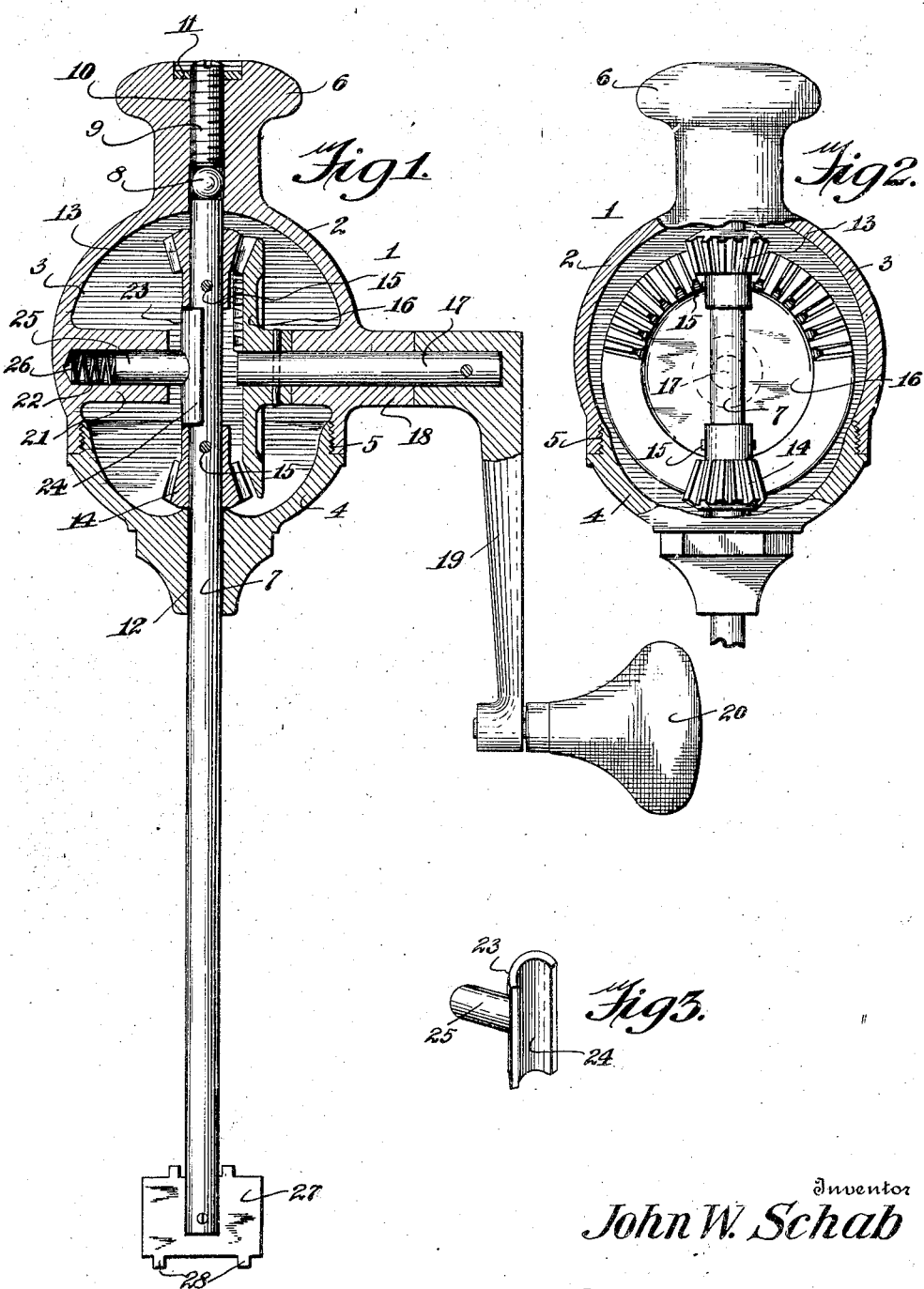

1,441,032

UNITED STATES PATENT OFFICE.

JOHN W. SCHAB, OF COLUMBUS, OHIO, ASSIGNOR TO THE NEW FAVORITE MANUFACTURING COMPANY, OF COLUMBUS, OHIO, A CORPORATION OF OHIO.

VALVE GRINDER.

Application filed March 23, 1921. Serial No. 454,606.

*To all whom it may concern:*

Be it known that JOHN W. SCHAB, a citizen of the United States, residing at Columbus, in the county of Franklin and State of Ohio, has invented certain new and useful Improvements in Valve Grinders, of which the following is a specification.

This invention relates to an improved valve grinder, and has for its object to provide a hand operated grinder wherein the valve oscillating stem is rotatably journaled in connection within a housing or casing, and is provided with fixed pinions capable of meshing with a hand rotated gear element the latter being of such effective size that the teeth thereof will alternately engage with said pinions, in order that the stem may be oscillated first in one direction and then in the other, the ratio of the teeth of the pinions and gear element being such that said stem will be caused to rotate more than a complete turn or revolution from any given starting point, a feature which materially assists in enabling the grinder to smoothly finish a valve seat and to eliminate ridges or deposits therefrom.

One of the salient objects of the present invention resides in the provision of a spring pressed shoe, which is mounted within the casing and is disposed to frictionally contact with the valve operating stem at a position between the fixed pinions carried by the stem, the purpose of this construction being to hold the stem substantially against rotation during the period of repose which exists therein when the gear element is out of mesh with the pinions, a feature in construction which serves to arrest undue rotation on the part of the stem, and to maintain said pinion substantially stationary, during said period of repose, by overcoming the momentum of the stem, thereby enabling the teeth of the gear element to properly and readily mesh with the teeth of the pinions with an entire absence of undue friction or gear locking movement, the construction thus serving to enable the grinder to be smoothly, conveniently and uniformly operated and with an entire absence of an intermittent, jerky or sudden uneven movements.

A further important object of the invention resides in positioning the shoe structure between the pinions and around the stem and in connecting the shoe structure substantially to the casing, in order that the ends of the shoe structure will engage with said pinions to prevent undue longitudinal movement on the part of the stem and to thus maintain the pinions properly in positions to freely and accurately mesh with the teeth of the gear element.

A still further object of the invention resides in the provision of an end thrust bearing for the stem, which serves to minimize friction and to render the operation of the valve grinder convenient and facile in manipulation.

This invention constitutes a continuation of the invention disclosed in my copending application, filed March 19, 1920, Serial Number 367,139, and the present invention is particularly directed to the mechanism disclosed in said application for maintaining the valve stem substantially stationary when the gear element is out of mesh with the stem carried pinions.

Other objects of the invention will be in part obvious and in part pointed out hereinafter.

The invention accordingly consists in the novel features of construction, combinations of elements and arrangements of parts, hereinafter to be fully described and to have the scope thereof pointed out in the appended claims.

In the accompanying drawing, forming a part of this specification, and in which similar characters of reference denote like and corresponding parts throughout the several views thereof:

Figure 1 is a vertical sectional view taken through a valve grinder constructed in accordance with the principles of the invention.

Figure 2 is a vertical sectional view taken on a plane substantially at right angles to that of the section disclosed in Figure 1, and Figure 3 is a perspective view of the shoe member.

Referring more particularly to the drawing, the numeral 1 designates the valve grinder comprising the present invention in its entirety. This grinder consists of a housing or casing 2, which is preferably of metallic construction and is formed to embody a hollow cup shaped main section 3, and a complemental and similarly formed lower section 4. The sections 3 and 4 are in this instance united by the threaded joint 5, in order that by the separation of the sections, interior parts may be rendered readily accessible and to facilitate the initial assembling of the grinder. The upper portion of the main section 3 terminates in an integral knob 6, which is of such form as to permit the grinder to be readily adapted to the conformation of the hand, or in other words to be conveniently and naturally grasped and held in an operative position by the hand of the operator. It will be apparent that the spherical formation of the housing 2 as a whole is of considerable assistance in enabling the grinder to be easily and conveniently manipulated during operation.

Vertically journaled within the housing 2 is the rotatable valve operating stem 7 of the grinder. This stem is so positioned that its upper end will be maintained in engagement with a spherical end thrust bearing 8, formed in the head or top of the housing 2. It is well known that in the operation of the valve grinder, considerable weight is imposed on the same in order that the operation of finishing or grinding a valve seat may be properly, expeditiously and uniformly carried out by the weight imposed. The imposition of this weight has frequently resulted in past structures in placing such stress upon the stem and its bearings, that the operation of the grinder as a whole has been rendered difficult and awkward by reason of the friction between movable parts. Therefore, in the present grinder the bearing 8 is provided at the upper end of the stem 7 in order to minimize the friction which results in the placing of pressure upon the grinder when the latter is employed. The relationship between the bearing 8 and the upper end of the stem may be adjusted by the provision of a threaded screw 9 which is threaded in the bore 10 provided in the knob 6, and a lock nut 11 is carried by the upper end of the screw 9 for holding the latter in adjusted positions. Obviously, by this construction free rotation on the part of the stem may be easily effected. The lower section 4 in the present grinder is provided with a central opening 12, which receives the stem 7 and acts as a bearing therefor, this bearing in combination with the bearing provided at the upper end of the stem, serves to retain the latter in a well supported yet freely rotatable manner within the housing 2.

Fixed to the stem 7 is a pair of opposed beveled pinions 13 and 14, which are pinned to the stem as at 15, in order to be rotatable in unison with said stem. Adapted to mesh with the teeth of these pinions in an alternate manner is a gear element 16, which is pinned or otherwise secured for rotation with a horizontally extending operating shaft 17, the latter being journaled for rotation within a relatively extended bearing 18 provided in the main section 3. The outer end of this shaft 17 is equipped with a manipulating crank arm 19, to the outer end of which is suitably connected a hand knob 20, which may be conveniently grasped to effect the manual rotation of the shaft 17 and its associated gear element 16. It will be observed that the gear element is provided with teeth which occupy a trifle less than one-half of the circumference of the gear element, and hence the teeth of said element will alternately mesh, where the shaft 17 is rotated in a given direction, with the teeth of the pinions 13 and 14. This arrangement has been disclosed in my aforesaid application, and has been found to be advantageous in effecting back and forth rotary movement on the part of the stem 7. It will be observed that the number of teeth in the pinions 13 and 14 are exactly the same and are adapted to mesh with the same portions of the teeth on the gear element 16, consequently the rotation of the stem will not be rotatably progressive, but that said stem, on the contrary, will be restored after each complete cycle of movement to its initial starting point. However, in order to prevent ridges or unevenness from presenting itself within the seat finished by the grinder, the ratio of teeth between the gear element and the pinions is such that for each complete revolution of the gear element 16, the stem 7 will rotate a distance slightly in excess of a full revolution, however, if the grinder is held stationary, the stem will be restored to its initial starting position after each complete revolution of the crank arm.

Formed in the casing 2 is an inwardly extending boss 21, in which is provided a bore 22, the latter being located in horizontal alignment with the bearing 18, so as to be conveniently produced and to be accurately located for reasons to be hereinafter set forth. Slidably received within the bore 22 is a shoe member 23, which constitutes one of the important elements of the present invention. This shoe member is formed to include a vertically extending, substantially semi-circular curved portion 24, which is adapted to frictionally engage the stem 7 and to be of such length that the ends thereof will substantially contact with the hubs of the pinions 13 and 14. Also, the shoe member is provided with a horizontally extending projection 25, which is slidably received within the bore 22 and is disposed to engage with one end of a coil spring 26 disposed within said bore, said spring engaging with the end of the bore and with the inner end of the projection 25 so as to force the shoe structure as a whole toward the stem 7 and particularly to maintain frictional contact between the curved portion 24 of the shoe member and said stem. By this construction, it will be manifest that when the teeth of the gear element are out of mesh with the teeth of the pinions 13 and 14, the shoe member, by frictionally engaging the stem, will serve substantially to arrest rotation on the part of the stem, or in other words to effect what may be termed an instantaneous pause in the rotation of the stem. This period of repose on the part of the stem is of decided advantage as regards smoothness of operation, since it results in bringing the pinions to rest, thus enabling the teeth of the gear element to easily, positively and accurately mesh with said pinions, and with the total absence of binding or locking, which has been heretofore present when the shoe structure has been omitted. Moreover, the shoe member serves in another important capacity, namely, by reason of the length of the portion 24 thereof, which engages with both of the pinions 13 and 14, vertical movement of an undue nature on the part of said stem will be precluded, with the result that the pinions will always be capable of accurately registering with the gear element 16. Also, the construction serves to avoid excessive adjustments of the screw 9.

From the foregoing description taken in conjunction with the accompanying drawing, it will be manifest that an efficient and reliable grinder is provided, and one fully capable of carrying out the objects and advantages of the invention. As usual, in devices of this character, the lower end of the stem 7 is bifurcated to receive a valve engaging member 27, and the latter being provided with the usual projections 28, which are designed to be placed in openings formed in engine valves for the purpose of rotating the latter in unison with the stem 7. By the provision of the features above described, a valve grinder is provided which is characterized by smoothness in operation, and by the ease and facility with which it may be manually manipulated. While the foregoing description specifically sets forth what is now believed to be the best mode of applying the principles of the invention, yet it should be understood that said description does not necessarily measure the invention except in such manner as the latter is defined by the following claims.

What is claimed is:

1. In a valve grinder, a housing, a stem rotatably journaled in connection with said housing, means for rotating said stem in a back and forth manner, comprising a pair of spaced pinions fixed to said stem, a rotatable gear element positioned within said housing and arranged for alternate engagement with said pinions, and a resilient shoe slidably supported of the housing and disposed in frictional contact with said stem and operating to arrest movement on the part of the stem when said gear element is out of engagement with said pinions.

2. In a valve grinder, a housing, a stem rotatably journaled in connection with said housing, means for rotating said stem in a back and forth manner, comprising a pair of spaced pinions fixed in opposed relationship to said stem, a rotatable gear element capable when revolving in a given direction of alternately engaging said pinions, and a spring pressed shoe disposed in engagement with said stem between said pinions to bring said stem to a state of repsose when said gear element is out on engagement with said pinions.

3. In a valve grinder, a housing, a stem rotatably journaled in connection with said housing, a pair of opposed pinions located within said housing and fixed to said stem, a gear element capable when rotating in a given direction of alternately meshing with said pinions to rotate said shaft back and forth, an operating shaft for said gear element, a bearing provided in said housing for the reception of said shaft, a boss formed internally of said housing and having a bore formed therein situated in horizontal alignment with said bearing, and a resilient shoe structure slidably supported in the bore provided in said boss and capable of frictionally engaging said stem.

4. In a valve grinder, a housing, composed of a relatively hollow cup shaped main section and a removable lower section, a stem rotatably journaled in connection with bearings provided in said sections, a pair of fixed pinions carried by said stem and situated within said housing, a gear element capable when rotated in one direction of alternately engaging with said pinions to rotate said stem back and forth, an operating shaft for said gear element, a bearing provided in said main section for the reception of said shaft, a boss integrally formed with said main section and having a bore provided therein disposed in horizontal alignment with said shaft bearing, and a resilient shoe structure slidably received within said bore and capable of frictionally engaging with said stem.

5. In a valve grinder, a housing, a stem rotatably journaled in connection with said housing, a pair of pinions fixed to said stem and located within said housing, a gear element capable of alternately meshing with said pinions, and means carried by said housing internally of the latter and independently of said stem, said means being disposed between said pinions and engaged with their opposed ends to limit longitudinal movement on the part of said stem.

6. In a valve grinder, a housing, a stem rotatably journaled in bearings provided by said housing, opposed pinions fixed to said stem and located internally of said housing, a gear element capable of alternately engaging with said pinions to rotate said stem in back and forth directions, and a spring pressed member slidably supported by the housing for loosely engaging said stem and situated to contact with the adjacent ends of said pinions to limit vertical longitudinal movement on the part of said stem.

7. In a valve grinder, a housing, a stem rotatably journaled within said housing, pinions fixed to said stem and located in opposed relationship, means alternately engaging with said pinions to rotate said stem back and forth, a shoe having a lateral projection arranged to be slidably received within a bore provided in said housing, a spring situated to engage said lateral projection and to force said shoe into frictional contact with said stem, and said shoe being extended so as to be capable of engaging with the adjacent ends of said pinions to limit the extent of longitudinal movement of said stem with respect to said housing, and to maintain said pinions in engagement with said means.

8. In a valve grinder, a housing, a valve stem rotatably journaled within said housing, an adjustable thrust bearing carried by the upper portion of said housing for engagement with the upper end of said stem, pinions fixed to said stem, a rotatable gear element capable of alternately meshing with the teeth of said pinions to oscillate said stem, and a resilient shoe structure disposed to engage with said stem and situated between said pinions so as to engage with the adjacent ends of the latter, whereby the adjustment provided by said end thrust bearing will be regulated.

In testimony whereof I affix my signature.

JOHN W. SCHAB.